H. G. PURINTON.
STREET CAR FENDER.
APPLICATION FILED NOV. 24, 1914.

1,188,319.

Patented June 20, 1916.
2 SHEETS—SHEET 1.

Inventor,
H. G. Purinton,
By Victor J. Evans,
Attorney.

Witnesses

H. G. PURINTON.
STREET CAR FENDER.
APPLICATION FILED NOV. 24, 1914.

1,188,319.

Patented June 20, 1916.
2 SHEETS—SHEET 2.

Witnesses:
C. Peinle, Jr.

Inventor,
H. G. Purinton.
By Victor J. Evans,
Attorney.

THE COLUMBIA PLANOGRAPH CO., WASHINGTON, D. C.

UNITED STATES PATENT OFFICE.

HARLOW G. PURINTON, OF LYONSVILLE, MASSACHUSETTS.

STREET-CAR FENDER.

1,188,319.   Specification of Letters Patent.   Patented June 20, 1916.

Application filed November 24, 1914.   Serial No. 873,779.

*To all whom it may concern:*

Be it known that I, HARLOW G. PURINTON, a citizen of the United States, residing at Lyonsville, in the county of Franklin and State of Massachusetts, have invented new and useful Improvements in Street-Car Fenders, of which the following is a specification.

The present invention relates to certain new and useful improvements in car fenders and one of the primary objects of the invention is to provide a fender that can be readily detached from or attached to the truck of a car.

Another object of the invention is to provide a fender which is so shaped as to direct an object therefrom to the opposite sides of the track and out of the path of the wheels of the car so that only a slight injury can be inflicted upon a person contacted by the fender.

It is a further object of the invention to provide a fender which may be readily raised or lowered as desired and to provide the same with a facing of soft material so that injury to a person caught by the fender will be reduced to a minimum.

A still further object of the invention is to provide a car fender which shall embody the desirable features of simplicity, cheapness in construction and thorough reliability in operation.

With the above and other objects in view, the improvement resides in the construction, combination and arrangement of parts set forth in the following specification and falling within the scope of the appended claims.

Figure 1:
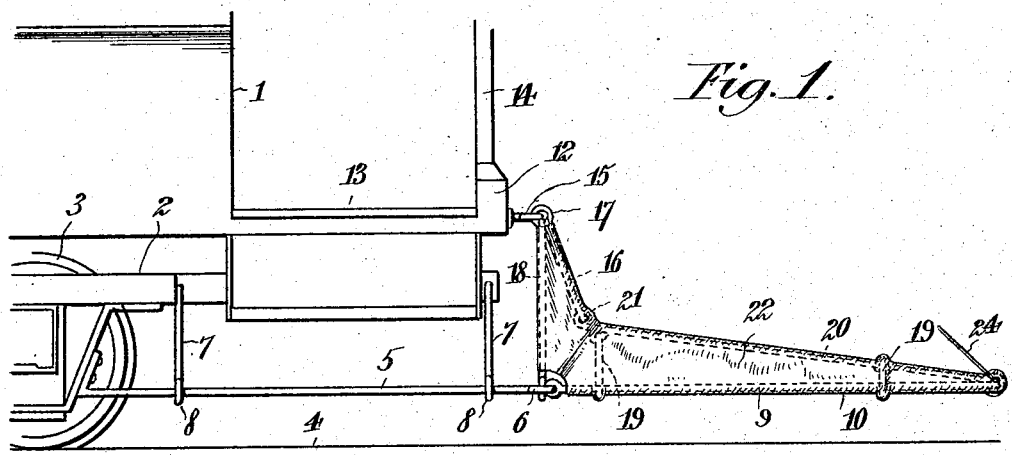
Figure 2:
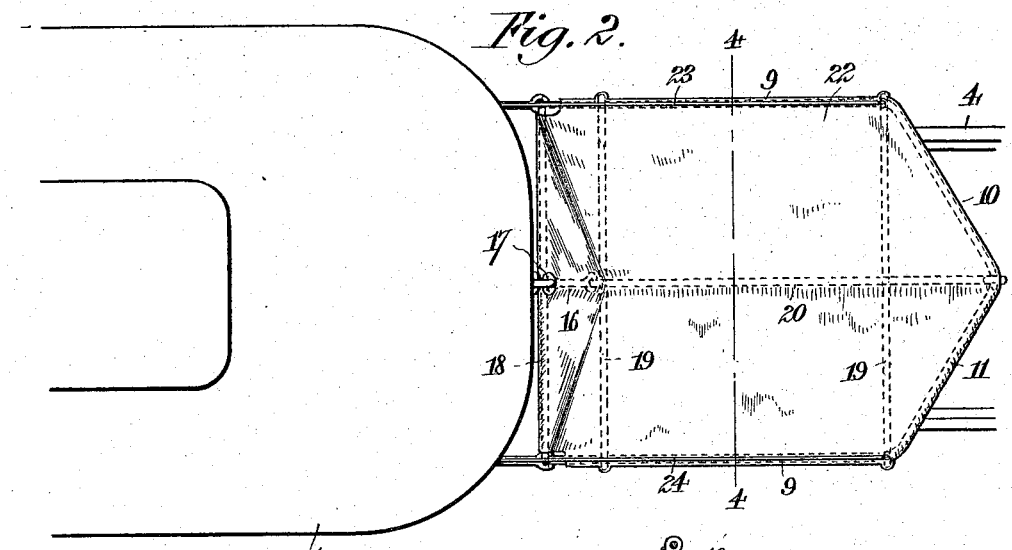
Figure 3:
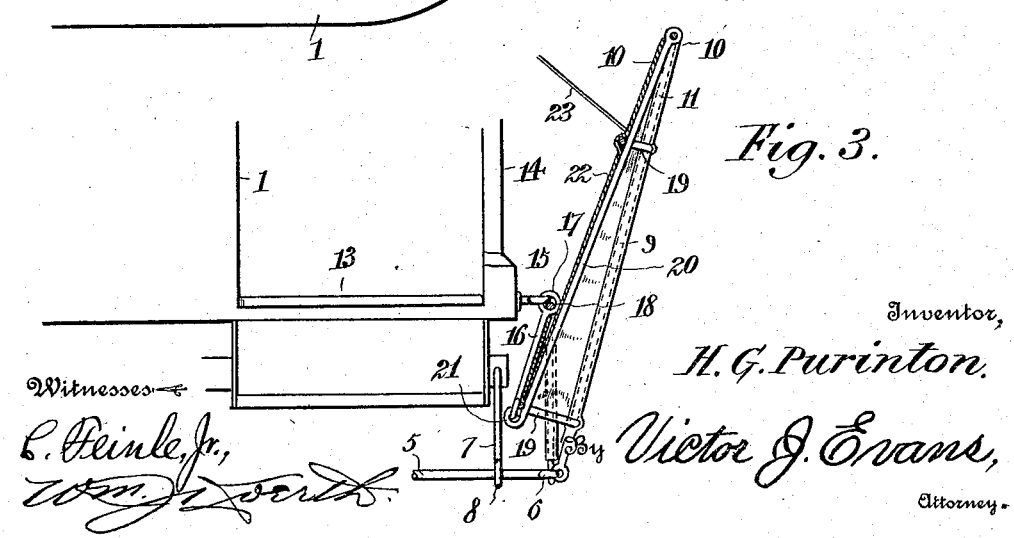
Figure 4:
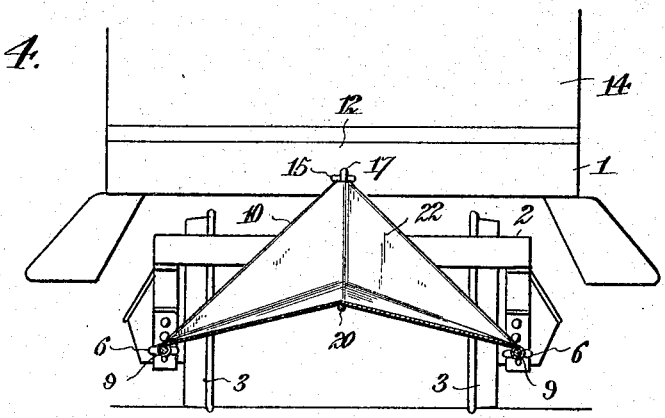
Figure 5:
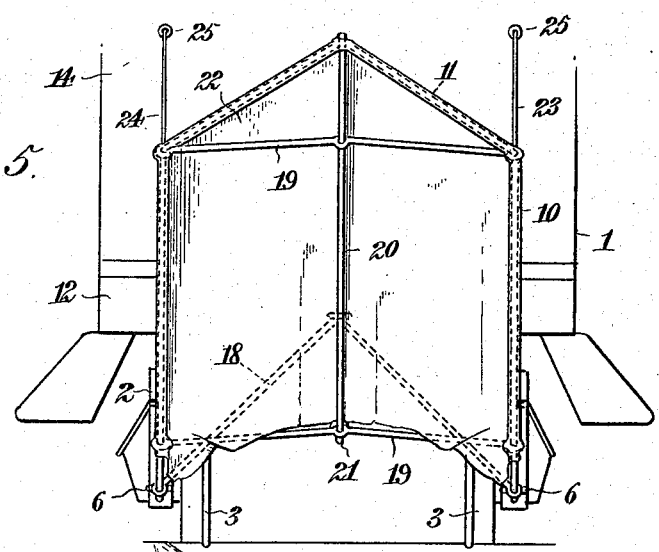
Figure 6:
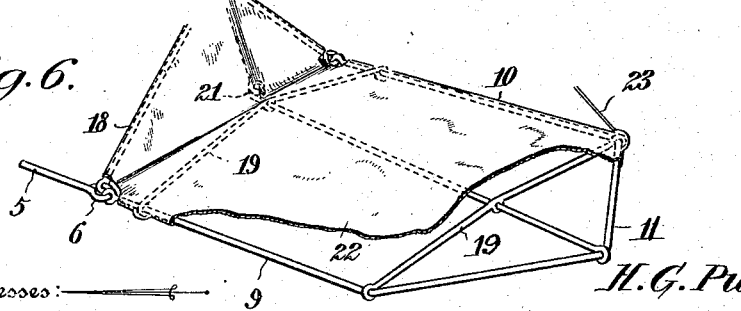

In the drawings: Figure 1 is a side elevation of a car equipped with a fender constructed in accordance with the present invention, Fig. 2 is a plan view of the same, Fig. 3 is a central sectional view showing the fender in its raised or folded position, Fig. 4 is a transverse sectional view on the line 4—4 of Fig. 2, Fig. 5 is a front elevation looking toward the car when the fender is folded upon the dash board thereof, and Fig. 6 is a detail perspective view of the fender, a portion of the fabric covering being removed.

In the accompanying drawings, in which like characters of reference designate corresponding parts throughout, the numeral 1 designates a portion of an ordinary street car, 2 the front truck of the car, 3 the wheels journaled upon the truck, and 4 the track upon which the car travels.

The front truck 2 has secured to its opposite sides longitudinally extending arms 5, the same projecting a suitable distance beyond the front of the truck and having their free ends provided with openings or eyes 6.

Arranged upon the front of the truck and disposed angularly thereof is a pair of brace members 7, the same having their ends provided with openings or otherwise engaging with the projecting ends of the arms 5, as indicated by the numerals 8.

Connected to the eyes 6 are the longitudinal side members 9 of a fender 10, the said sides having their extremities bent outwardly toward the center, as at 11, providing the end members of the frame, and preferably the end and the sides are constructed of a single element. The outer beam 12 of the platform 13 of the car 1 below the dashboard 14 is centrally provided with an eye or staple 15, and the numeral 16 designates a link which is loosely connected with the staple 15 through the medium of an eye 17 formed upon the upper end of the link.

The numeral 18 designates an angular brace which is hung from the staple 15 and which has its ends formed with eyes which engage in the eyes 6 of the arms 5. The side members 9 of the fender 10 are connected by a plurality of arched or V-shaped members 19.

The central portion or apex of the rear member is projected above the frame a greater distance than is the apex of the forward or outer connecting bar 19. Connected with the center of the angular front 11 of the frame and with the central portions of the members 19 is a longitudinally extending bar 20. The inner end of this bar terminates slightly beyond the inner connecting bar 19 and is provided with an eye 21 to receive the free end of the link 16 and to retain the said link normally at an angle to the frame proper. The numeral 22 designates a fabric covering or facing for the frame, the same being stretched over the arched connecting bars 19, the angularly disposed bar 20 and stitched or otherwise secured to the sides 9 as well as the arched or angular brace member 18 of the fender 10. The angularly disposed link 16 will contact with the cover or facing 22 at the normally vertical rear portion thereof and the construction of the frame is such that the facing will slant from its center toward the sides of the member 18 as well as the sides 19 and 10 of the fender. This arrangement provides a space between the main body of the facing 22 and the main portion of the frame, so that the body will give slightly but sufficiently to prevent a person engaged by the cylinder being violently thrown against the metal frame and thereby injured. Again, the fabric facing being substantially V-shaped in cross section will have a tendency to direct an obstacle received thereupon to the opposite sides of the fender and consequently to the opposite sides of the track 4 out of the path of contact of the wheels 3 of the truck.

The numerals 23 and 24 designate flexible members which are connected to the frame of the fender, preferably at the bend between the side arms and the end of the frame, the said flexible members passing through suitable openings or staples 25 in the dashboard and these members are connected together so that the motorman may swing the frame against the dashboard to the position illustrated in Figs. 3 and 5 when the car is not in use or when the fender is not needed.

Having thus described the invention, what I claim is:

1. A fender for cars comprising a member loosely supported on the end of a car and having straight sides, an oppositely inclined connecting member at the outer ends of the sides, a substantially V-shaped loosely connected member at the inner ends of the sides, arched brace members for the sides, a central longitudinal member connecting the braces at the outer end of the fender, and a link connection between the said longitudinal member and the mentioned V-shaped member at the inner end of the fender.

2. In a car fender, the combination with a car having longitudinal members at its ends provided with eyes, a supporting member on the car disposed above and centrally of the longitudinal members, a frame including a lower member comprising parallel sides loosely connected with the eyes, a V-shaped member hung from the supporting member and having its ends loosely connected with the eyes, arch-shaped transverse members for the frame, a longitudinal member centrally connected with the outer end of the frame and with the arch-shaped members, a link hung from the support and loosely connected with the said longitudinal members, and a fabric facing stretched over the frame and connected with the mentioned lower member therefor and with the mentioned V-shaped member thereof.

3. A car fender comprising a frame including parallel arms which are loosely connected at the front end of the car and an angular connecting member for the said parallel members, a substantially V-shaped member loosely connected at the front of the car and centrally supported from the car, a link depending from the mentioned support, transverse connecting members for the mentioned longitudinal parallel members, a central longitudinal member for the frame loosely connected with the link, a fabric facing for the frame, and means for swinging the fender against the car.

In testimony whereof I affix my signature in presence of two witnesses.

HARLOW G. PURINTON.

Witnesses:
 FRITZ C. JOHNSON,
 ERNEST B. FRANCIS.

Copies of this patent may be obtained for five cents each, by addressing the "Commissioner of Patents, Washington, D. C."